(12) United States Patent
Kang et al.

(10) Patent No.: US 9,304,356 B2
(45) Date of Patent: Apr. 5, 2016

(54) LIQUID CRYSTAL DISPLAY AND METHOD FOR MANUFACTURING THE SAME

(75) Inventors: Suk Hoon Kang, Seoul (KR); Jun Woo Lee, Seongnam-si (KR); Baek Kyun Jeon, Yongin-si (KR); Kyoung Tae Kim, Osan-si (KR); Soo-Ryun Cho, Gunpo-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 258 days.

(21) Appl. No.: 13/288,457

(22) Filed: Nov. 3, 2011

(65) Prior Publication Data

US 2012/0314168 A1  Dec. 13, 2012

(30) Foreign Application Priority Data

Jun. 7, 2011 (KR) .................. 10-2011-0054614

(51) Int. Cl.
G02F 1/1337 (2006.01)
(52) U.S. Cl.
CPC .... G02F 1/133723 (2013.01); G02F 1/133788 (2013.01); *B32B 2457/202* (2013.01); *G02F 2001/133742* (2013.01); *G02F 2001/133773* (2013.01); *Y10T 428/1018* (2015.01); *Y10T 428/1023* (2015.01)
(58) Field of Classification Search
CPC ............ G02F 1/1337; G02F 1/133711; G02F 1/133723; G02F 1/133753; G02F 1/133788; G02F 2001/133738; G02F 2001/133742; G02F 2001/133757; G02F 2001/133761; G02F 2001/133773; G02F 2001/133776; Y10T 428/1023; Y10T 428/1018; B32B 2457/202

USPC .......... 428/1.1, 1.2, 1.25–1.28; 349/123–130, 349/132–136
See application file for complete search history.

(56) References Cited

U.S. PATENT DOCUMENTS

| | | | |
|---|---|---|---|
| 5,773,559 A * | 6/1998 | Miyamoto et al. ............. | 528/353 |
| 7,351,454 B2 * | 4/2008 | Lee et al. ....................... | 428/1.2 |
| 2003/0112394 A1 * | 6/2003 | Yoshida et al. ................ | 349/123 |
| 2005/0288480 A1 * | 12/2005 | Marck et al. .................. | 528/310 |
| 2009/0146105 A1 * | 6/2009 | Oh et al. .................... | 252/299.61 |
| 2009/0325453 A1 * | 12/2009 | Lee et al. .......................... | 445/58 |
| 2010/0053525 A1 * | 3/2010 | Sawatari et al. .............. | 349/123 |
| 2010/0085523 A1 * | 4/2010 | Terashita et al. .............. | 349/123 |
| 2010/0128214 A1 * | 5/2010 | Lee et al. ....................... | 349/130 |
| 2010/0151155 A1 * | 6/2010 | Kwak et al. ................... | 428/1.26 |
| 2010/0157223 A1 * | 6/2010 | Shin et al. ..................... | 349/129 |
| 2010/0197186 A1 * | 8/2010 | Shin et al. ....................... | 445/24 |
| 2011/0234955 A1 * | 9/2011 | Mizusaki et al. ............. | 349/123 |

FOREIGN PATENT DOCUMENTS

| | | | | |
|---|---|---|---|---|
| WO | WO 2010061491 A1 * | 6/2010 | ............. | C08G 73/10 |
| WO | WO 2010106915 A1 * | 9/2010 | ............. | G02F 1/1337 |

* cited by examiner

*Primary Examiner* — Gwendolyn Blackwell
*Assistant Examiner* — Eli D Strath
(74) *Attorney, Agent, or Firm* — Cantor Colburn LLP

(57) ABSTRACT

A liquid crystal display including a first substrate and a second substrate facing each other, a first alignment layer disposed on the first substrate, the first alignment layer including a vertical photo-alignment material, a second alignment layer disposed on the second substrate, the second alignment layer including a vertical alignment material, and a liquid crystal layer disposed between the first substrate and the second substrate.

3 Claims, 14 Drawing Sheets

LIQUID CRYSTAL DISPLAY AND METHOD FOR MANUFACTURING THE SAME

This application claims priority to Korean Patent Application No. 10-2011-0054614, filed on Jun. 7, 2011, and all the benefits accruing therefrom under 35 U.S.C. §119, the content of which in its entirety, are herein incorporated by reference.

BACKGROUND OF THE INVENTION (a) Field of the Invention

A liquid crystal display and a method for manufacturing the same are provided.

(b) Description of the Related Art

A liquid crystal display is the type of flat panel display that is most widely used at present, and includes two display panels on which field generating electrodes, such as a pixel electrode and a common electrode, are formed, and a liquid crystal layer that is interposed therebetween. The liquid crystal display displays an image by applying a voltage to the field generating electrode to generate an electric field on the liquid crystal layer, thereby determining the direction of liquid crystal molecules of the liquid crystal layer, and controlling the polarization of incident light.

An alignment layer for aligning liquid crystal molecules of the liquid crystal layer is formed inside of the display panel. In the case where a voltage is not applied to a field generating electrode, the liquid crystal molecules are arranged in a predetermined direction by the alignment layer, in the case where the voltage is applied to the field generating electrode, the liquid crystal molecules rotate according to the direction of the electric field.

BRIEF SUMMARY OF THE INVENTION

Disclosed is a liquid crystal display including: a first substrate and a second substrate facing each other; a first alignment layer disposed on the first substrate, the first alignment layer including a vertical photo-alignment material; a second alignment layer disposed on the second substrate, the second alignment layer including a vertical alignment material; and a liquid crystal layer disposed between the first substrate and the second substrate.

The vertical photo-alignment material may include a first vertical functional group and a photo-reactive functional group, and the vertical alignment material may include a second vertical functional group and does not include the photo-reactive functional group.

The first alignment layer may be pretilted, and the second alignment layer may not be pretilted.

The liquid crystal layer may include a liquid crystal material, and the liquid crystal display may further include a pixel including a plurality of domains in which an alignment direction of a first portion of the liquid crystal material of a first domain is different than an alignment direction of a second portion of the liquid crystal material of a second domain.

The vertical alignment material may include a normal diamine group which does not include the photo-reactive functional group or the vertical functional group.

The vertical photo-alignment material may include a photo-reactive diamine group, and the photo-reactive diamine group may include a first diamine group, a first flexible group bonded to the first diamine group, a photo-reactive functional group bonded to the first flexible group, and a first vertical functional group bonded to the photo-reactive functional group.

The vertical alignment material may include a vertical diamine group, and the vertical diamine group may include a second diamine group, a second flexible group bonded to the second diamine group, and a second vertical functional group bonded to the second flexible group.

The vertical photo-alignment material may be a polyamic acid compound represented by the following Formula 17 or a polyimide compound represented by the following Formula 18:

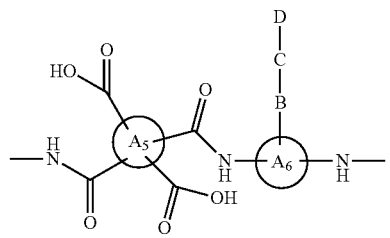

Formula 17

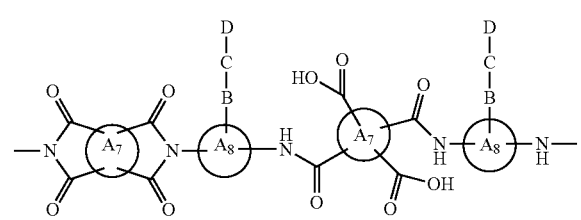

Formula 18 wherein in Formula 17 and the Formula 18, $A_5$-$A_8$ are each independently a substituted or unsubstituted $C_6$-$C_{24}$ aryl group or a substituted or unsubstituted $C_3$-$C_{24}$ cycloalkyl group, B is a flexible group, C is a photo-reactive functional group and D is a vertical functional group.

The vertical alignment material may be a polyamic acid compound represented by the following Formula 19 or a polyimide compound represented by the following Formula 20:

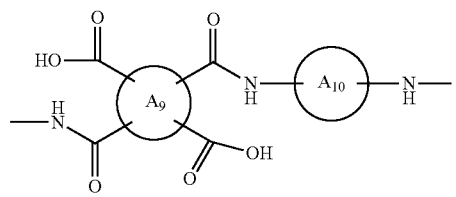

Formula 19

-continued

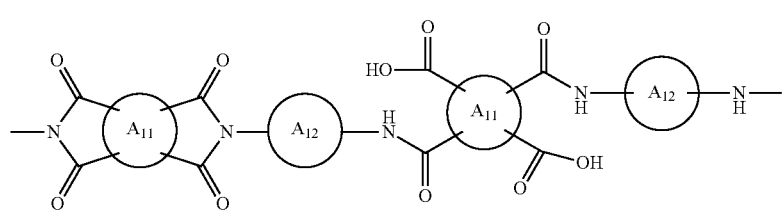

Formula 20 wherein in Formula 19 and Formula 20, $A_9$-$A_{12}$ are each independently a substituted or unsubstituted $C_6$-$C_{24}$ aryl group or a substituted or unsubstituted $C_3$-$C_{24}$ cycloalkyl group.

Also provided is a method for manufacturing a liquid crystal display, including: disposing a vertical photo-alignment material on a first substrate; forming a first alignment layer by irradiating light onto the vertical photo-alignment material; forming a second alignment layer by disposing a vertical alignment material on the second substrate; and forming a liquid crystal layer by disposing a liquid crystal material between the first substrate and the second substrate to manufacture the liquid crystal display.

In an embodiment, light may not be irradiated onto the vertical alignment material.

In an embodiment, light may be irradiated in a first alignment direction and in a second alignment direction using a photomask. The first alignment direction and the second alignment direction may be opposite to each other.

Light may be irradiated in a third alignment direction and a fourth alignment direction using the photomask. The third alignment direction may be perpendicular to the first alignment direction, and the third alignment direction and the fourth alignment direction may be opposite to each other.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
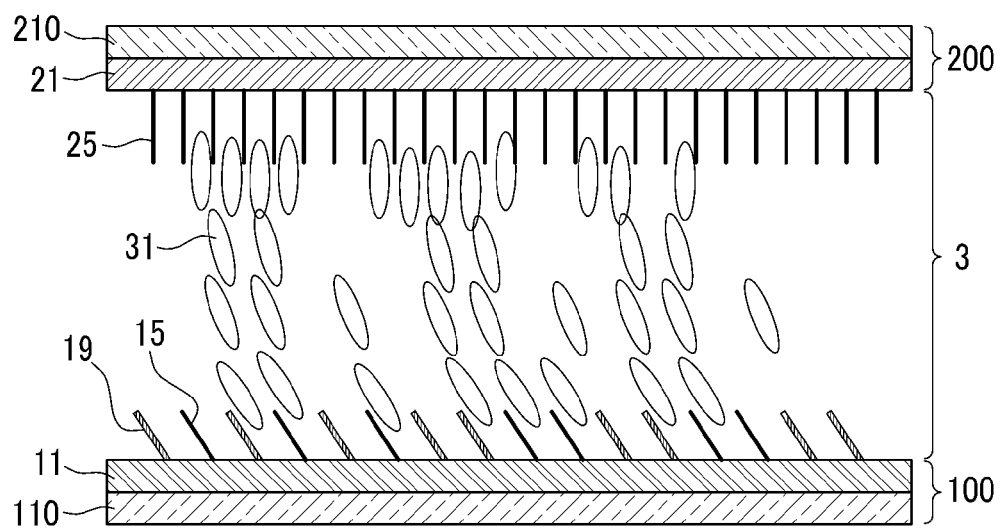
FIG. 1 is a cross-sectional view of an exemplary embodiment of a liquid crystal display.

Exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. In addition, the detailed description of the widely known technologies will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "beneath" another element, it can be directly beneath the other element or intervening elements may also be present. In contrast, when an element is referred to as being "directly beneath" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise specifically stated, the term "substituted" means that compound or group is substituted by halogen, a $C_1$-$C_{12}$ haloalkyl group, a $C_1$-$C_{12}$ alkyl group, a $C_1$-$C_{12}$ alkoxy group, a $C_6$-$C_{12}$ aryl group, or a $C_6$-$C_{12}$ aryloxy group, instead of hydrogen, provided that the substituted atom's normal valence is not exceeded.

"Alkoxy" means an alkyl group that is linked via an oxygen (i.e., alkyl-O—), for example methoxy, ethoxy, and sec-butyloxy groups.

"Alkylene" means a straight or branched chain, saturated, divalent aliphatic hydrocarbon group, (e.g., methylene (—$CH_2$—) or, propylene (—$(CH_2)_3$—)).

"Aryl" means a cyclic group in which all ring members are carbon and all rings are aromatic, the group having the specified number of carbon atoms, and having a valence of at least one, optionally substituted with one or more substituents where indicated, provided that the valence of the aryl group is not exceeded. More than one ring may be present, and any additional rings may be fused, pendant, spirocyclic, or a combination thereof.

"Cycloalkyl" means a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded. Cycloalkyl groups do not include an aromatic ring or a heterocyclic ring. When the numbers of carbon atoms is specified (e.g., C3 to C15 cycloalkyl), the number means the number of ring members present in the one or more rings.

The prefix "halo" means a group or compound including one more of a fluoro, chloro, bromo, iodo, and astatino substituent. A combination of different halo groups (e.g., bromo and fluoro) can be present.

The term "bonded" means that two groups are connected via a direct bond between two atoms of the groups, or via one or more atoms bonded between the groups. In an embodiment, "bonded" means a direct bond between two atoms of the groups.

FIG. 1 is a cross-sectional view of an exemplary embodiment of a liquid crystal display.

With reference to FIG. 1, the liquid crystal display has a vertical alignment ("VA") mode. The liquid crystal display includes a first display panel 100 and a second display panel 200 facing each other and a liquid crystal layer 3 disposed between the first display panel 100 and the second display panel 200.

The first display panel 100 includes a first substrate 110. The first substrate 110 may be an insulator. A first alignment layer 11 is disposed on the first substrate 110. The first display panel 100 may include a plurality of signal lines (not shown) disposed on the first substrate 110, a switching element (not shown) such as a thin film transistor connected thereto, and a plurality of pixel electrodes (not shown) connected to the switching element.

The second display panel 200 includes a second substrate 210. The second substrate 210 may be an insulator. A second alignment layer 21 is disposed on the second substrate 210. The second display panel 200 may include a counter electrode (not shown) that faces a pixel electrode of the first display panel 100.

A liquid crystal material 31 of a liquid crystal layer 3 has dielectric anisotropy. The liquid crystal material 31 is aligned so as to be approximately vertical with respect to a major surface of each of the first and second substrates 110 and 210, and may be tilted at a predetermined pretilt angle with respect to a tangent line of each the major surfaces of the first and second substrates 110 and 210 at a portion contacting the surfaces of the first and second alignment layers 11 and 21.

A liquid crystal display includes a plurality of pixels PX that are each a unit for displaying an image. In order to provide a wide viewing angle, the pixel PX in the liquid crystal display having the vertical alignment ("VA") mode may include a plurality of domains in which alignment directions of different portions of the liquid crystal material 31 are different from each other. Thus an alignment direction of a first portion of the liquid crystal material of a first domain may be different from an alignment direction of a second portion of the liquid crystal material of a second domain The first alignment layer 11 and the second alignment layer 21 are different types of alignment layers. The first alignment layer 11 may include a vertical photo-alignment material, and the second alignment layer 21 may include a vertical alignment material. In another embodiment, the first alignment layer 11 may include the vertical alignment material instead of the vertical photo-alignment material, and the second alignment layer 21 may include the vertical photo-alignment material instead of the vertical alignment material. The vertical alignment material may have a larger anchoring energy than the vertical photo-alignment material.

The vertical photo-alignment material includes a vertical functional group 15 and a photo-reactive functional group 19. While not wanting to be bound by theory, it is believed that because the vertical alignment material includes a vertical functional group 25 and does not include the photo-reactive functional group, it is possible to substantially or effectively prevent deterioration of a response speed, deterioration of alignment stability, deterioration of stability with respects to alignment layer printing, deterioration of environmental stability, an increase of residual image, and a decrease of electrical characteristics that may be caused by the photo-reactive functional group. In addition, since the photo-reactive functional group is not included in the vertical alignment material, a cost may be reduced. The density of the vertical functional group 15 of the vertical photo-alignment material may be appropriately selected.

In an embodiment, the vertical alignment material includes a vertical functional group 25. The vertical functional group 25 that is included in the vertical alignment material may be a functional group having a large affinity to the liquid crystal material 31, such that the anchoring energy with respect to the vertical functional group and the liquid crystal material is increased, thus increasing the response speed of the liquid crystal material, increasing alignment stability with respect to light such as ultraviolet rays, and decreasing the residual image. The density of the vertical functional group 25 of the vertical alignment material may be appropriately selected.

The photo-reactive functional group 19 and vertical functional group 15 of the vertical photo-alignment material may be pretilted by the photo-alignment process. However, since the vertical alignment material is not applied with the photo-alignment process, the vertical functional group 15 of the vertical alignment material may be pretilted. By performing an exposure process using a mask two times in only the first alignment layer 11, between the first alignment layer 11 and the second alignment layer 21, the liquid crystal material 31 may be aligned in an inclined direction in a plan view, and one or more domains may be formed. In addition, since in an embodiment a photo-alignment process is applied to only the first alignment layer 11, the entire process may be simplified. Since the photo-alignment process is applied to the first alignment layer 11, use of a reactive mesogen in the first alignment layer 11 can be omitted, and fine patterning of the electrode or the protrusion can also be omitted if desired. Accordingly, an increase of the residual image and an increase of the exposure time, which may be desirable when using the reactive mesogen, may be substantially or entirely avoided, and transmittance deterioration and contrast ratio deterioration of the liquid crystal display, which may occur when using the electrode or the protrusion of the fine pattern, may be substantially or entirely avoided.

The vertical photo-alignment material is a polymer having a weight average molecular weight of approximately 1,000 Daltons to about 1,000,000 Daltons, specifically about 10,000 Daltons to about 900,000 Daltons, more specifically about 20,000 Daltons to about 800,000 Daltons, and which includes at least one main chain and at least one side chain bonded to the main chain. The side chain may include at least one of a flexible functional group, a thermoplastic functional group, a photo-reactive functional group, or a vertical functional group, or the like. The main chain may include at least one of a polyimide, polyamic acid, polyamide, polyamicimide, polyester, polyethylene, polyurethane, or polystyrene, or the like. The greater the number of cyclic structures present in the main chain, such as the imide group included in the main chain, the greater the hardness of the main chain and the more the electrical characteristics are improved, such that an occurrence of stains, which may occur when the liquid crystal display is driven for a long time, may decrease, and stability with respect to the pretilt of the alignment layer may increase. The pretilt angle of the liquid crystal material by the alignment layer may be about 90 degrees to about 100 degrees, specifically about 91 degrees to about 99 degrees, more specifically about 92 degrees to about 98 degrees.

The vertical photo-alignment material may be manufactured using a polymer polymerization reaction of a diamine monomer and acid anhydride. The diamine monomer may include the side chain bonded to at least one of the flexible group, the photo-reactive functional group, the vertical functional group, or the like. For example, the polyimide polymer or the polyamic acid polymer may be polymerized by contacting (e.g., reacting) the diamine and the acid anhydride at a ratio of about 50 mole percent (mol %):about 50 mol %, based on the total moles of the diamine and the acid anhydride. In an embodiment, one or more diamines and one or more of acid anhydrides may be used in the manufacture of the vertical photo-alignment material. For example, the vertical photo-alignment material may be a homopolymer or a copolymer.

Herein, the diamine may include at least one of a photo-reactive diamine, a vertical diamine, and a normal diamine. At least one diamine of the photo-reactive diamine, the vertical diamine, and the normal diamine may be used in the manufacturing of the vertical photo-alignment material. In addition, at least one type of the photo-reactive diamine, at least one type of the vertical diamine, and at least one type of the normal diamine may be used in manufacturing of the vertical photo-alignment material. The vertical alignment properties and the alignment stability may be improved by controlling the composition ratio of the copolymer of the photo-reactive diamine, the vertical diamine, and the normal diamine, if present.

The photo-reactive diamine includes the diamine group, the flexible group, the photo-reactive functional group, and the vertical functional group. The vertical diamine includes a diamine group, a flexible group, and a vertical functional group, and does not include a photo-reactive functional group. The normal diamine includes the diamine group and does not include either of the photo-reactive functional group or the vertical functional group. For example, in the photo-reactive diamine, the flexible group may be bonded to the diamine group, the photo-reactive functional group may be bonded to the flexible group, and the vertical functional group may be bonded to the photo-reactive functional group. In the vertical diamine, the flexible group may be bonded to the diamine group, and the vertical functional group may be bonded to the flexible group.

The diamine may be represented by the following Formulas 1 to 9, but is not limited thereto.

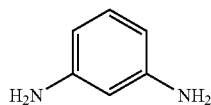
Formula 1

Formula 2

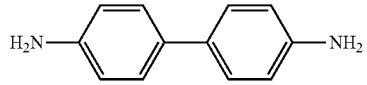
Formula 3

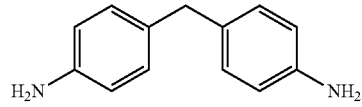
Formula 4

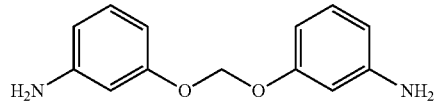
Formula 5

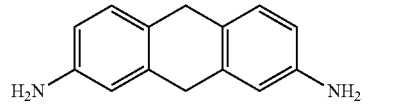
Formula 6

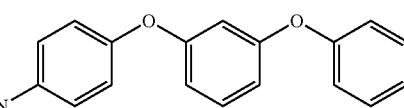
Formula 7

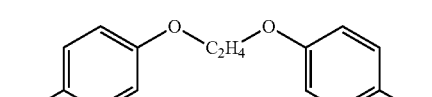
Formula 8

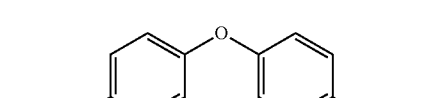
Formula 9

The flexible group and the thermosetting functional group are each independently a functional group that may help the side chain bonded to the polymer main chain to be more easily aligned.

For example, the flexible group and thermosetting functional group may each independently include at least one of —O—, —OCO—, —C(O)O—, —OR— wherein, R is H or a $C_1$-$C_5$ alkyl group, —R— wherein R is a $C_1$-$C_5$ alkylene group, or imide group, but is not particularly limited thereto. The flexible group and the thermosetting functional group may each independently include a substituted or unsubstituted alkylene group or alkoxy group, each of which may independently include about 3 to 20 carbon atoms.

The photo-reactive functional group is a functional group that directly causes a photo dimerization reaction or a photo isomerization reaction when irradiated with ultraviolet rays.

For example, the photo-reactive functional group may include at least one of an azo functional group, a cinnamate functional group, a chalcone functional group, a coumarin functional group, or a maleimide functional group, but is not particularly limited thereto.

The vertical functional group is a functional group that may move the entire side chain in an approximate vertical direction with respects to the main chain, which may be approximately parallel to the first substrate 110 or the second substrate 210.

For example, the vertical functional group may include at least one of a substituted or unsubstituted $C_6$-$C_{26}$ aryl group wherein the substitution may be a $C_1$-$C_{25}$ alkyl group or a $C_1$-$C_{25}$ alkoxy group, a substituted or unsubstituted $C_6$-$C_{26}$ cyclohexyl group wherein the substitution may be a $C_1$-$C_{25}$ alkyl group or a $C_1$-$C_{25}$ alkoxy group, a steroid group, or a cholesteric group, but is not particularly limited thereto. Herein, one or more aryl groups and one or more cyclohexyl groups may be directly connected to each other or through the $C_1$-$C_5$ alkylene group.

For example, the acid anhydride may be represented by the following Formulas 10 to 16, and is not particularly limited thereto.

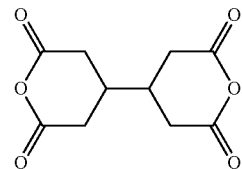
Formula 10

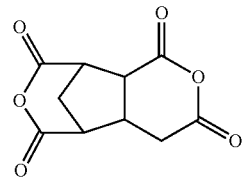
Formula 11

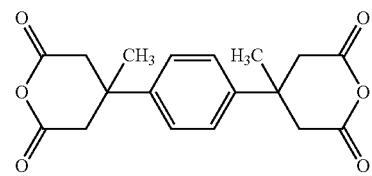
Formula 12

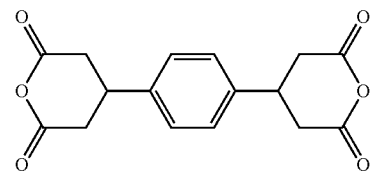
Formula 13

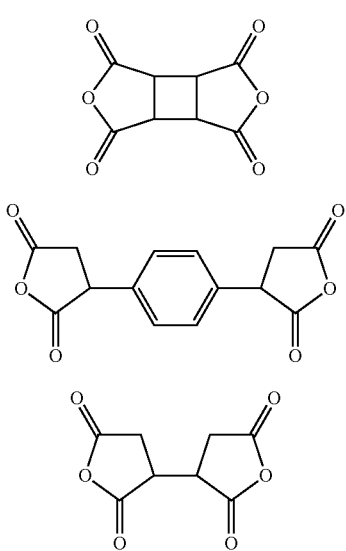

Formula 14

Formula 15

Formula 16

For example, the vertical photo-alignment material may be a polyamic acid compound represented by the following Formula 17 or a polyimide compound represented by the following Formula 18. The polyimide may be manufactured by imidizing a polyamic acid.

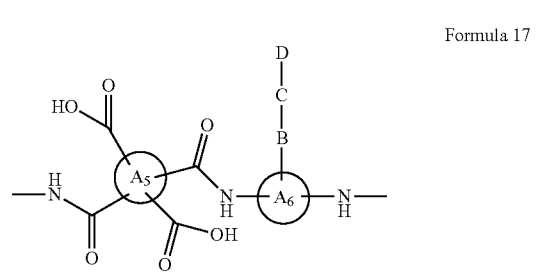

Formula 17

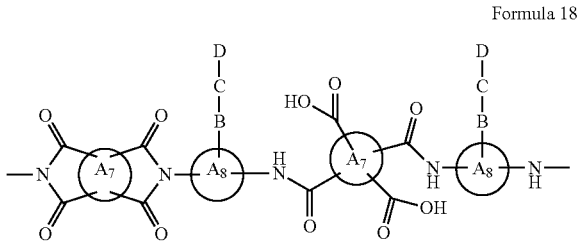

Formula 18

In Formula 17 and the Formula 18, $A_5$-$A_8$ are each independently a substituted or unsubstituted $C_6$-$C_{24}$ aryl group or a substituted or unsubstituted $C_3$-$C_{24}$ cycloalkyl group, B is a flexible group, C is a photo reactive group, and D is a vertical functional group.

The vertical alignment material is a polymer material having a weight average molecular weight is approximately 1,000 Daltons to about 1,000,000 Daltons, specifically about 10,000 Daltons to about 900,000 Daltons, more specifically about 20,000 Daltons to about 800,000 Daltons, and includes at least one main chain and at least one side chain bonded to one main chain. The side chain may include at least one of a flexible group, a thermosetting group, and other functional groups so long as they do not adversely affect the properties of the material, and one or more vertical functional groups, and does not include the photo-reactive functional group. The main chain may include at least one of a polyimide, polyamic acid, polyamide, polyamicimide, polyester, polyethylene, polyurethane, or polystyrene.

The vertical alignment material may be manufactured using the polymer polymerization reaction of a diamine monomer and acid anhydride. The diamine monomer includes a side chain that is bonded to the flexible group, and the vertical functional group, and is not bonded to the photo-reactive functional group. For example, the polyimide polymer or the polyamic acid polymer may be polymerized by contacting (e.g., reacting) the diamine and the acid anhydride at a ratio of about 50 mol %:about 50 mol %, based on the total moles of the diamine and the acid anhydride. In addition, one or more diamines may be used in manufacturing of the vertical alignment material, and one or more acid anhydrides may be used in manufacturing of the vertical alignment material. For example, the vertical alignment material may be a homopolymer or a copolymer.

At least at least one diamine of the vertical diamine and the normal diamine may be used in manufacturing of the vertical alignment material, and the photo-reactive diamine is not used in manufacturing of the vertical alignment material. In addition, at least one or more vertical diamines and one or more normal diamines may be used in manufacturing of the vertical alignment material. The vertical alignment properties and the alignment stability may be improved by controlling the composition ratio of the copolymer of the vertical diamine and the normal diamine. A description of vertical diamine and normal diamine is the same as the above description, and thus is not repeated.

For example, the vertical alignment material may be a polyamic acid compound represented by the following Formula 19 or a polyimide compound represented by the following Formula 20. Polyimide may be manufactured by imidizing a polyamic acid.

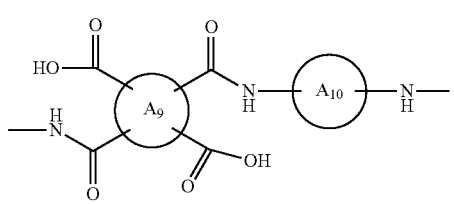

Formula 19

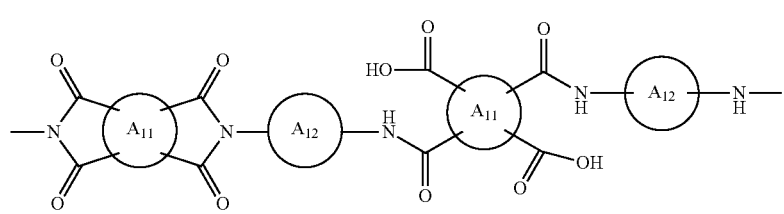

Formula 20

In Formula 19 and Formula 20, $A_9$-$A_{12}$ are each independently a substituted or unsubstituted $C_6$-$C_{24}$ aryl group or a substituted or unsubstituted $C_3$-$C_{24}$ cycloalkyl group.

A manufacturing method of the liquid crystal display will be further disclosed.

After forming a plurality of thin films on the first substrate 110, a pixel electrode is formed. Next, after disposing (e.g., coating) the vertical photo-alignment material on the pixel electrode, the first alignment layer 11 is formed by the photo-alignment process by irradiating light such as ultraviolet rays. A counter electrode is formed on the second substrate 210. Next, the second alignment layer 22 is formed by disposing (e.g., coating) the vertical alignment material, and at the same time, the photo-alignment process is not applied. Next, the liquid crystal layer 3 is formed by disposing (e.g., injecting) the liquid crystal material between the first and second display panels 100 and 200.

Figure 2:
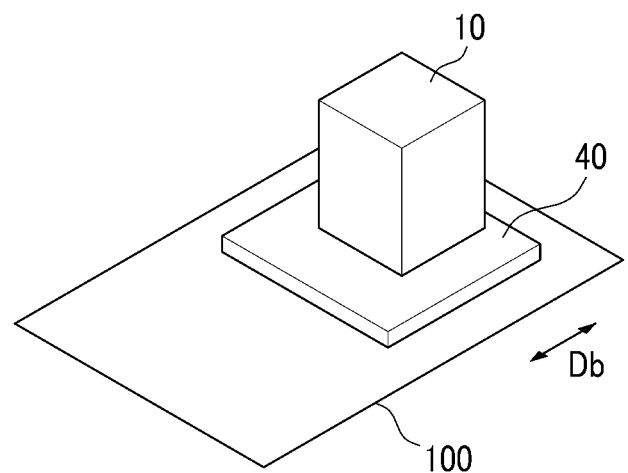
FIG. 2 is a schematic diagram that illustrates an exemplary embodiment of an exposure apparatus.
Figure 3:
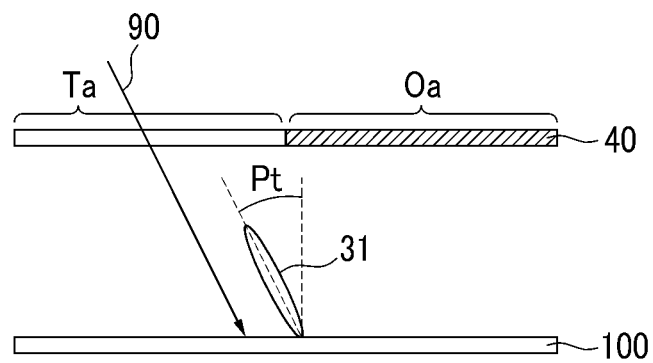
FIG. 3 is an illustration of an exemplary embodiment of a photo-alignment process.
Figure 4:
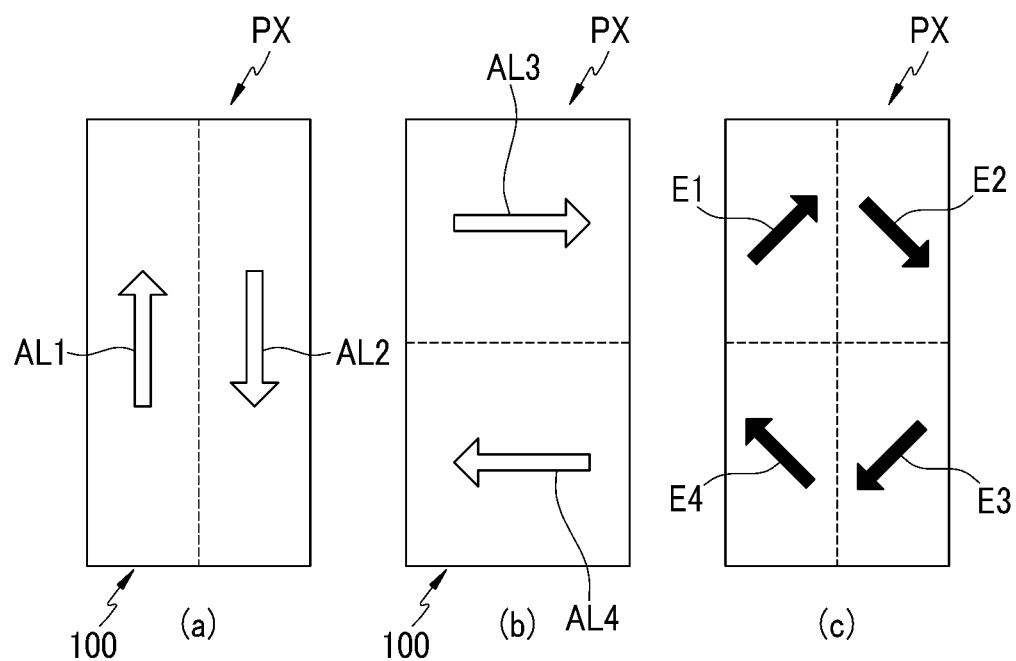
FIG. 4 is a top plan view that illustrates an exemplary embodiment of an alignment direction of an alignment layer to liquid crystal molecules of an alignment layer with respect to one pixel and an alignment direction of the liquid crystal molecules.

With reference to FIG. 2, FIG. 3, and FIG. 4, an exposure apparatus used in the photo-alignment process and a photo-alignment process using the same will be further disclosed.

FIG. 2 is a schematic diagram that illustrates an embodiment of an exposure apparatus, FIG. 3 is a view that illustrates an embodiment of a photo-alignment process, and FIG. 4 is a top plan view that illustrates an embodiment of an alignment direction of an alignment layer to liquid crystal molecules of an alignment layer with respect to one pixel and an alignment direction of the liquid crystal molecules.

With reference to FIG. 2, the exposure apparatus includes at least one photomask 40 and light source 10. A fixed first display panel 100 may be scanned in a selected direction Db by moving the photomask 40 and the light source 10 together. In addition, the photomask 40 and the light source 10 may be fixed and the first display panel 100 may be moved. The light source 10 may irradiate light such as ultraviolet rays, and the light may be partially polarized ultraviolet rays or linearly polarized ultraviolet rays.

With reference to FIG. 3, the photomask 40 of the exposure apparatus includes a transmission part Ta which transmits light, and a light blocking part Oa which blocks light transmission. The transmission part Ta and the light blocking part Oa may be alternately disposed. Light 90 emitted from the light source 10 passes through the transmission part Ta of the photomask 40 and is irradiated onto the vertical photo-alignment material of the first alignment layer 11 of the first display panel 100, thereby inducing a photoreaction, such as a photopolymerization reaction. If light is inclinedly irradiated onto the surface of the first display panel 100, the liquid crystal material 31 that is adjacent to the surface of the first display panel 100 may be inclined while a long axis thereof forms a predetermined pretilt angle Pt with respect to the tangent line of the surface of the first display panel 100.

In order to form a plurality of domains in a pixel PX of the liquid crystal display, an irradiation direction of light with respect to the pixel PX may vary.

With reference to FIG. 4A, when the photomask 40 is disposed on the first display panel 100 of the liquid crystal display and light is inclinedly irradiated in a first alignment direction AL1, at a first portion (e.g., left portion) of the pixel PX, a pretilt direction of the liquid crystal material 31 that is adjacent to the surface of the first display panel 100 may become the first alignment direction AL1. When light is inclinedly irradiated in a second alignment direction AL2 that is an opposite direction of the first alignment direction AL1 while light is irradiated in the first alignment direction AL1 or before and after light is irradiated in the first alignment direction AL1, at a second portion (e.g., a right portion) of the pixel PX, the pretilt direction of the liquid crystal material 31 that is adjacent to the surface of the first display panel 100 may become the second alignment direction AL2.

With reference to FIG. 4B, when the photomask 40 is disposed on the first display panel 100 and light is inclinedly irradiated in a third alignment direction AL3 and in a fourth alignment direction AL4 that is opposite the direction of the third alignment direction AL3, in the pixel PX, the pretilt direction of the liquid crystal material 31 that is adjacent to the surface of the first display panel 100 may each become the third alignment direction AL3 and the fourth alignment direction AL4.

After the photo-alignment process, when the first and second display panels 100 and 200 are disposed on (e.g., connected to) each other and the liquid crystal panel is manufactured by disposing (e.g., injecting) the liquid crystal material, at an intermediate portion of the liquid crystal layer 3, the liquid crystal material 31, as shown in FIG. 4C, may be aligned in different directions, e.g., first to fourth directions E1, E2, E3, and E4, respectively. Accordingly, in an embodiment four different domains may be formed in the pixel PX. The first through fourth alignment directions E1, E2, E3, and E4 illustrated in FIG. 4C may be an average alignment direction of the liquid crystal material 31 in an entire thickness direction of the liquid crystal layer 3.

In an embodiment wherein the first alignment layer 11 includes the vertical alignment material instead of the vertical photo-alignment material and the second alignment layer 21 includes the vertical photo-alignment material instead of the vertical alignment material, the photo-alignment process is applied to the second display panel 200 instead of the first display panel 100.

Hereinafter, the disclosed embodiments will be described in more detail with reference to the following Examples. The disclosed embodiments shall not be limited by the following Examples.

Comparative Example 1

The vertical photo-alignment material was synthesized by polymerizing 70 mol % of the photo-reactive diamine represented by the following Formula 21, 30 mol % of vertical diamine including the cholesteric group, and 100 mol % of acid anhydride represented by Formula 11.

After coating the vertical photo-alignment material on the first substrate 110 and the second substrate 210, the alignment layer was formed on each substrate by irradiating ultraviolet rays onto the first and second substrates 110 and 220. Next, the liquid crystal panel was manufactured by injecting the liquid crystal for vertical alignment ("VA") mode between the first and second substrates 110 and 220.

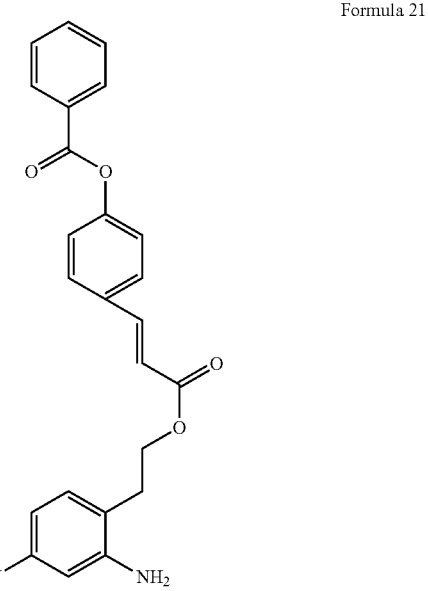

Formula 21

Comparative Example 2

The vertical photo-alignment material was synthesized using the same method as Comparative Example 1. After coating the vertical photo-alignment material on the first substrate 110 and the second substrate 210, the alignment layer was formed on each substrate by irradiating ultraviolet rays onto only the first substrate 110 of the first and second substrates 110 and 220. Next, the liquid crystal panel was manufactured by injecting the liquid crystal for VA mode between the first and second substrates 110 and 220.

Comparative Example 3

The vertical photo-alignment material was synthesized using the same method as Comparative Example 1, except that 50 mol % of the photo-reactive diamine represented by Formula 21 and 50 mol % of the vertical diamine represented by Formula 22 were used. After coating the vertical photo-alignment material on the first substrate 110 and the second substrate 210, the alignment layer was formed on each substrate by irradiating ultraviolet rays onto only the first substrate 110 of the first and second substrates 110 and 220. Next, the liquid crystal panel was manufactured by injecting the liquid crystal for VA mode between the first and second substrates 110 and 220.

Example 1

The vertical photo-alignment material was synthesized in the same method as Comparative Example 1. The vertical alignment material was synthesized by polymerizing 100 mol % of vertical diamine represented by Formula 22 and 100 mol % of acid anhydride represented by Formula 11.

After the synthesized vertical photo-alignment material and the synthesized vertical alignment material were coated on the first substrate 110 and the second substrate 210, the alignment layer was formed on each substrate by irradiating ultraviolet rays onto only the first substrate 110 of the first and second substrates 110 and 220. Next, the liquid crystal panel was manufactured by injecting the liquid crystal for VA mode between the first and second substrates 110 and 220.

Example 2

The vertical photo-alignment material was synthesized in the same method as Comparative Example 1. The vertical alignment material was synthesized by polymerizing 100 mol % of vertical diamine represented by the following Formula 22 and 100 mol % of acid anhydride represented by Formula 11.

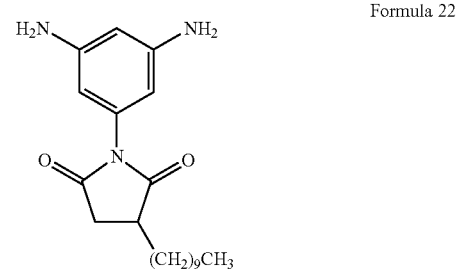

Formula 22

After coating the synthesized vertical photo-alignment material and the synthesized vertical alignment material on the first substrate 110 and the second substrate 210, the alignment layer was formed on each substrate by irradiating ultraviolet rays to only the first substrate 110 of the first and second substrates 110 and 220. Next, the liquid crystal panel was manufactured by injecting the liquid crystal for VA mode between the first and second substrates 110 and 220.

Example 3

The vertical photo-alignment material was synthesized in the same method as Comparative Example 1. The vertical alignment material was synthesized by polymerizing 100 mol % of vertical diamine represented by the following Formula 23 and 100 mol % of acid anhydride represented by Formula 11.

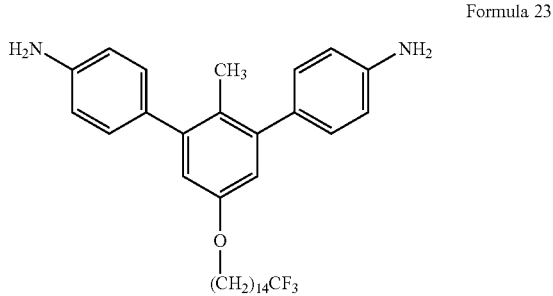

Formula 23

After coating the synthesized vertical photo-alignment material and the synthesized vertical alignment material on the first substrate 110 and the second substrate 210, the alignment layer was formed on each substrate by irradiating ultraviolet rays onto only the first substrate 110 of the first and second substrates 110 and 220. Next, the liquid crystal panel was manufactured by injecting the liquid crystal for VA mode between the first and second substrates 110 and 220.

Example 4

The vertical photo-alignment material was synthesized in the same method as Comparative Example 1. The vertical alignment material was synthesized by polymerizing 50 mol % of a vertical diamine represented by Formula 22, 50 mol % of a normal diamine represented by Formula 1, and 100 mol % of acid anhydride represented by Formula 11.

After coating the synthesized vertical photo-alignment material and the synthesized vertical alignment material on the first substrate 110 and the second substrate 210, respectively, the alignment layer was formed on each substrate by irradiating ultraviolet rays onto only the first substrate 110 of the first and second substrates 110 and 220. Next, the liquid crystal panel was manufactured by injecting the liquid crystal for VA mode between the first and second substrates 110 and 220.

Example 5

The vertical photo-alignment material was synthesized in the same method as Comparative Example 1. The vertical alignment material was synthesized by polymerizing 30 mol % of the vertical diamine represented by Formula 22, 70 mol % of the normal diamine represented by Formula 1, and 100 mol % of acid anhydride represented by Formula 11.

After coating the synthesized vertical photo-alignment material and the synthesized vertical alignment material on the first substrate 110 and the second substrate 210, respectively, the alignment layer was formed on each substrate by irradiating ultraviolet rays on to only the first substrate 110 of the first and second substrates 110 and 220. Next, the liquid crystal display panel was manufactured by injecting the liquid crystal for VA mode between the first and second substrates 110 and 220.

Evaluation of the Response Speed of Liquid Crystal

Figure 5:
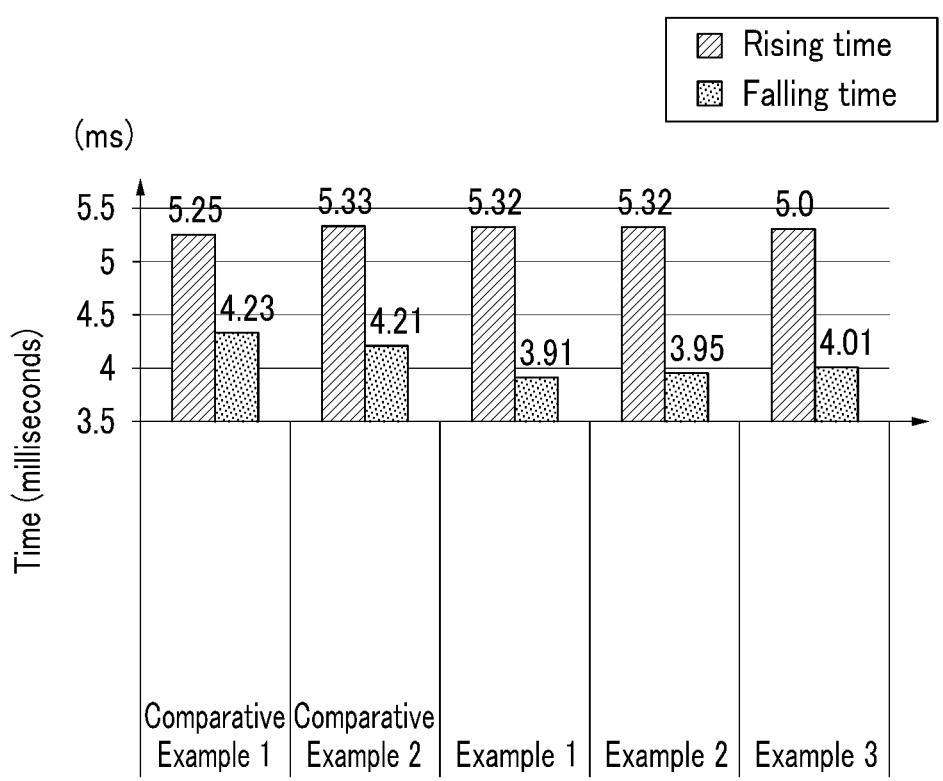
FIG. 5 is a graph of response speed (milliseconds, ms) that illustrates a response speed of liquid crystal in a liquid crystal display for Comparative Examples 1 and 2 and Examples 1 to 3.

For the liquid crystal display panels of Comparative Examples 1 and 2 and Examples 1 to 3, results of measuring the rising time and the falling time of the liquid crystal material are shown in FIG. 5. FIG. 5 is a graph that illustrates a response speed of the liquid crystal in a liquid crystal display. With reference to FIG. 5, in Examples 1 to 3, the falling is faster as compared to Comparative Examples 1 and 2.

Figure 6:
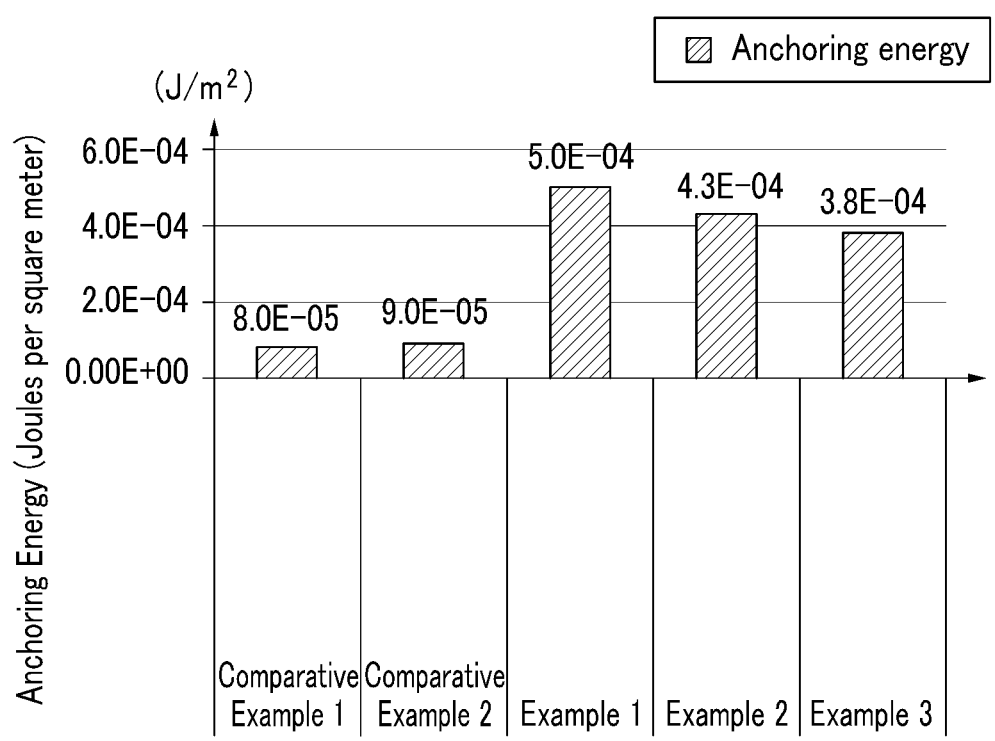
FIG. 6 is a graph of anchoring energy (Joules per square meter, J/m²) that illustrates anchoring energy with respect to a liquid crystal material and an alignment layer in the liquid crystal display for Comparative Examples 1 and 2 and Examples 1 to 3.

Evaluation of Anchoring Energy with Respect to the Liquid Crystal and the Alignment Layer For the liquid crystal display panels of Comparative Examples 1 and 2 and Examples 1 to 3, results of measuring the anchoring energy with respect to the liquid crystal material and the alignment layer are shown in FIG. 6. FIG. 6 is a graph that illustrates anchoring energy with respect to a liquid crystal material and an alignment layer in the liquid crystal display. With reference to FIG. 6, in Examples 1 to 3, the anchoring energy is larger as compared to Comparative Examples 1 and 2.

Evaluation of the Pretilt and the Anchoring Energy

Figure 7:
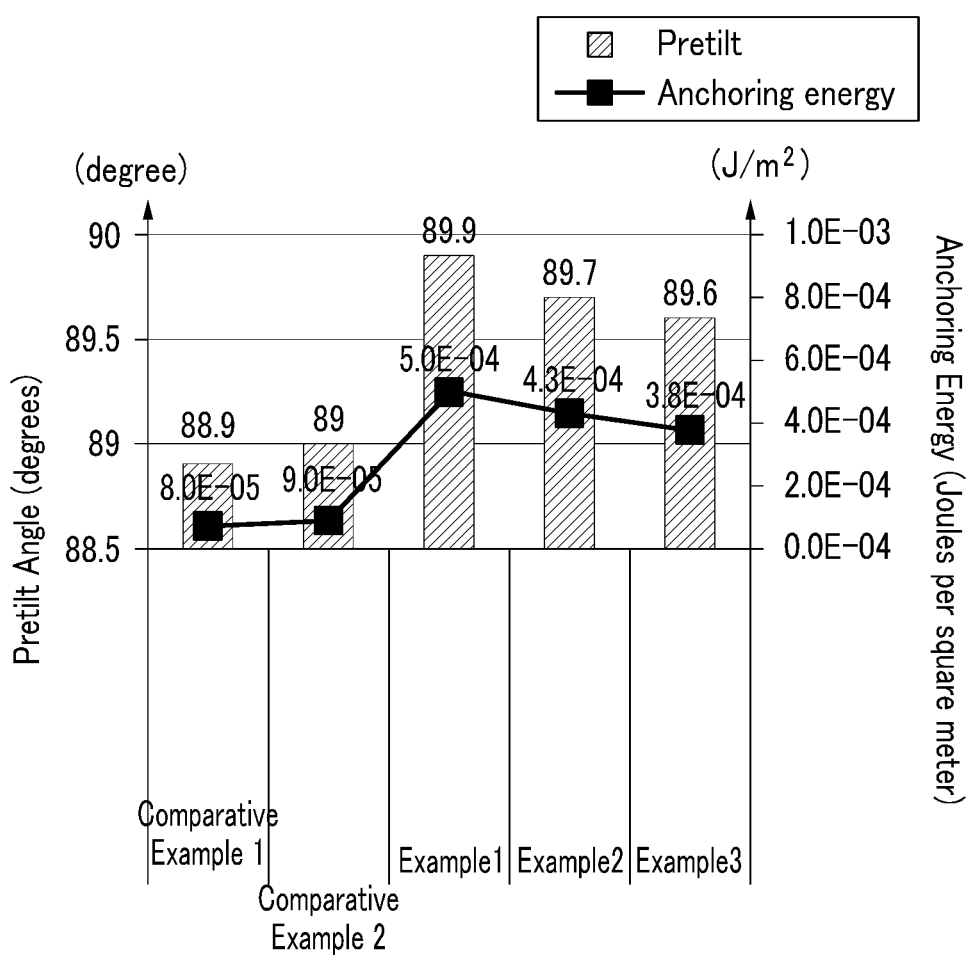
FIG. 7 is a graph of pretilt (degrees) and anchoring energy (Joules per square meter, J/m²) that illustrates a pretilt and an anchoring energy in the liquid crystal display for Comparative Examples 1 and 2 and Examples 1 to 3.

For the liquid crystal display panels of Comparative Examples 1 and 2 and Examples 1 to 3, results of measuring the pretilt of the liquid crystal material and the anchoring energy with respects to the liquid crystal material and the alignment layer are shown in FIG. 7. FIG. 7 is a graph that illustrates pretilt and anchoring energy in the liquid crystal display. With reference to FIG. 7, the larger the anchoring energy in respects to the liquid crystal material and the alignment layer is, the larger the pretilt of the liquid crystal material is.

Figure 8:
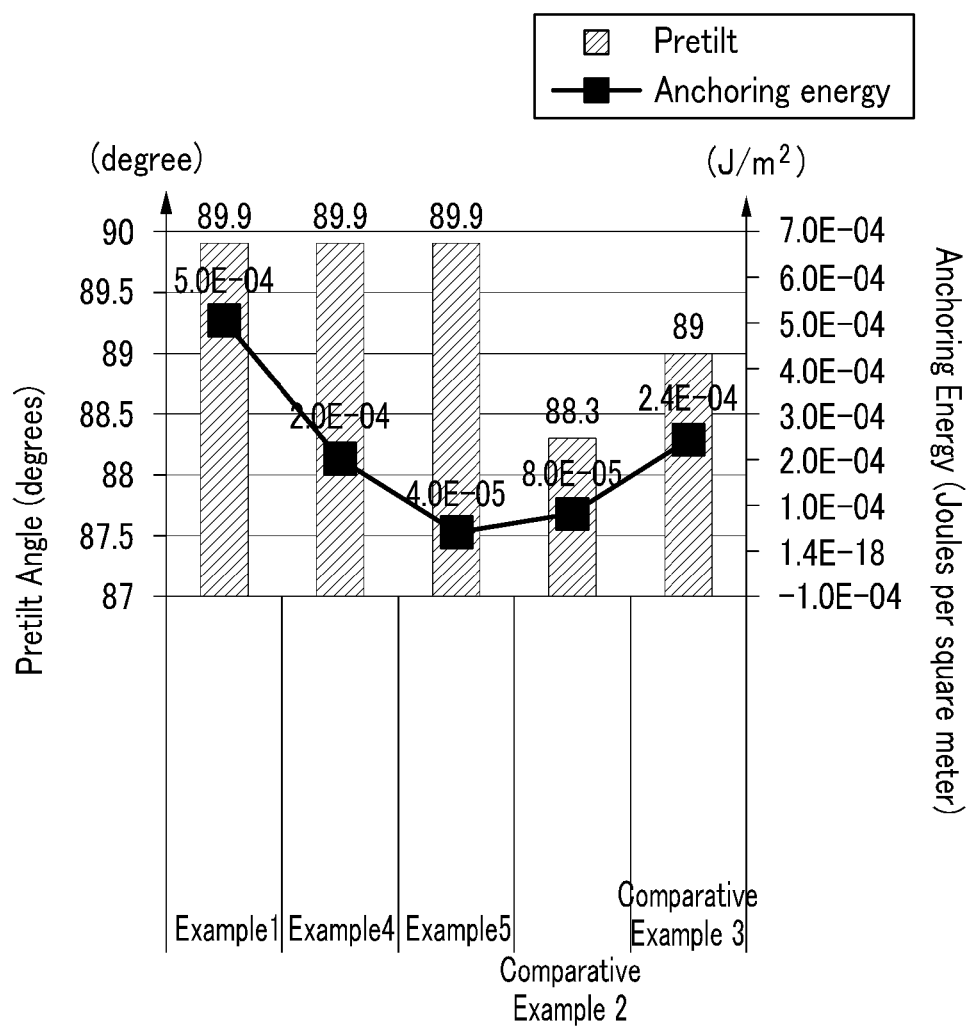
FIG. 8 is a graph of pretilt (degrees) and anchoring energy (Joules per square meter, J/m²) that illustrates the pretilt and the anchoring energy in the liquid crystal display for Examples 1, 4 and 5 and Comparative Examples 2 and 3.

For the liquid crystal display panels of Comparative Examples 2 and 3 and Examples 1, 4 and 5, results measuring the pretilt of the liquid crystal material and the anchoring energy with respect to the liquid crystal material and the alignment layer are shown in FIG. 7. FIG. 8 is a graph that illustrates the pretilt and the anchoring energy in the liquid crystal display. With reference to FIG. 8, the more the content of the vertical functional group is, the larger the anchoring energy with respect to the liquid crystal material and the alignment layer is.

Figure 9:
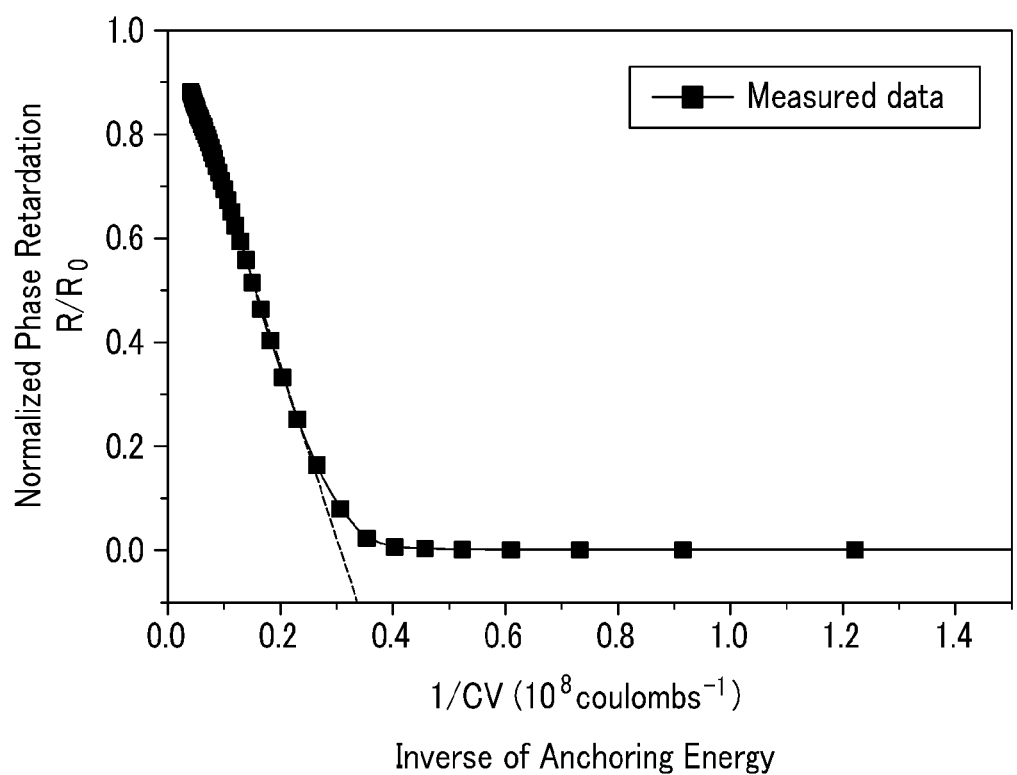
FIG. 9 is a graph of normalized phase retardation versus the inverse of anchoring energy (1/10⁸ coulombs) for determining polar anchoring energy.

Polar anchoring energy is derived by the following Equations 1 to 6 and FIG. 9. FIG. 9 is a graph that derives polar anchoring energy.

$$\frac{R}{R_0} = -\frac{1}{CV}\frac{\xi}{\Delta n}I(b, \gamma, v, \frac{\pi}{2}) + \left(1 + \frac{2K_{33}}{Wd}\right) \quad \text{Equation 1}$$

$$R = \frac{2\pi}{\lambda}\int_0^d (n_{eff} - n_o)dz \quad \text{Equation 2}$$

$$n_{eff} = \frac{n_o}{(1 - v\cos^2\phi)^{1/2}} \quad \text{Equation 3}$$

$$v = \frac{(n_e^2 - n_o^2)}{n_e^2} \quad \text{Equation 4}$$

$$b = \frac{\Delta\varepsilon}{\varepsilon_0\varepsilon_\perp} \quad \text{Equation 5}$$

$$\xi = \frac{\varepsilon_0\varepsilon_\perp S}{d}\pi\sqrt{\frac{K_{33}}{\Delta\varepsilon}} \quad \text{Equation 6}$$

$$\gamma = \frac{K_{11} - K_{33}}{K_{33}} \quad \text{Equation 7}$$

In the Equations, W is anchoring energy, R is a phase retardation, $R_0$ is a maximum phase retardation, $R/R_0$ is a normalized phase retardation, λ is a wavelength of light, V is an applied voltage, C is a capacity of liquid crystal, d is a thickness of a liquid crystal layer, S is a plan area of an electrode, Φ is a pretilt angle, $K_{11}$ is a splay elastic constant, $K_{33}$ is a bend elastic constant, Δn is a refractive anisotropy, no is an ordinary refractive index, $n_e$ is an extraordinary refractive index, Δ∈ is a dielectric anisotropy, $\in_0$ is a horizontal dielectric constant, and $\in_\perp$ is a perpendicular dielectric constant.

(ξ/Δn)I(b, γ, v, π/2) is a value that does not relate to the applied voltage V, and a constant determined according to a type of liquid crystal. From the linear region in the graph in FIG. 9, when 1/CV is 0, the value of $R/R_0$ is derived, and the anchoring energy W is calculated therefrom.

Evaluation of the Alignment Stability

Figure 10:
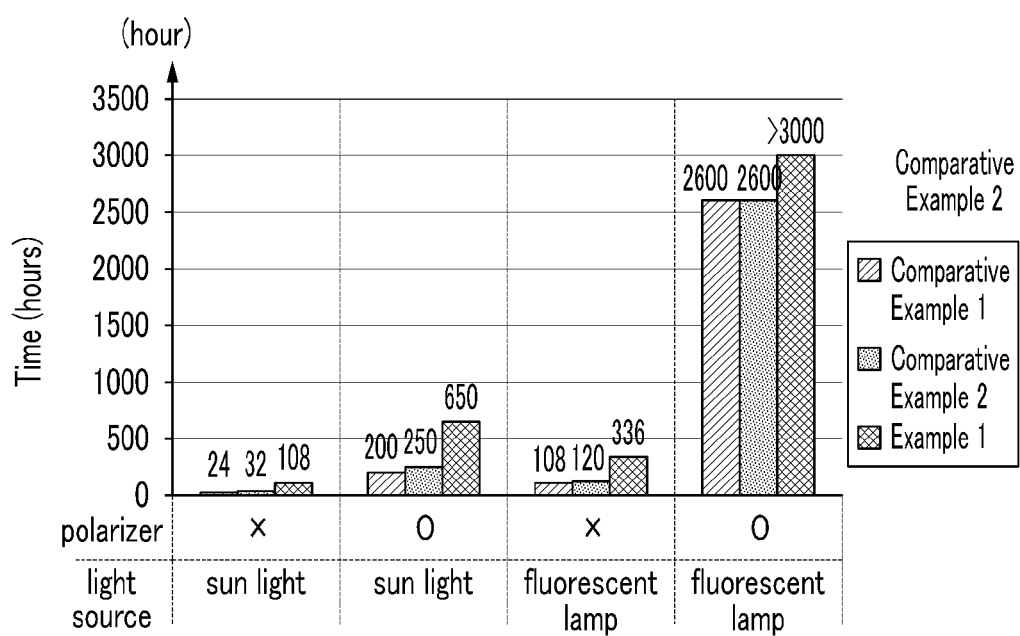
FIG. 10 is a graph of time (hours) that illustrates alignment stability in the liquid crystal display for Comparative Examples 1 and 2 and Example 1.

For the liquid crystal display panels of Comparative Examples 1 and 2 and Example 1, results of measuring the alignment stability are shown in FIG. 10. FIG. 10 is a graph that illustrates alignment stability in the liquid crystal display. The y axis represents a time preventing deformation of the alignment layer, and as the time is increased, the alignment stability is increased. With reference to FIG. 10, in Example 1, the alignment stability is higher as compared to Comparative Examples 1 and 2.

Evaluation of the Stability of the Alignment Layer Printing

Figure 11:
FIG. 11 is a graph of pretilt angle change (degrees) that illustrates stability of alignment layer printing in the liquid crystal display for Comparative Examples 1 and 2 and Example 1.

For the liquid crystal panels of Comparative Examples 1 and 2 and Example 1, results of measuring the stability of the alignment layer printing are shown in FIG. 11. FIG. 11 is a graph that illustrates the stability of alignment layer printing in the liquid crystal display. The y axis represents a change amount of the pretilt angle, and as the change amount is decreased, the stability of the alignment layer printing is increased. With reference to FIG. 11, in Example 1, the stability of the alignment layer printing is higher as compared to Comparative Examples 1 and 2. The amount of change in the pretilt angle before the exposure is larger than the amount of change in the pretilt angle after the exposure.

Evaluation of the Environmental Stability of the Alignment Layer

Figure 12:
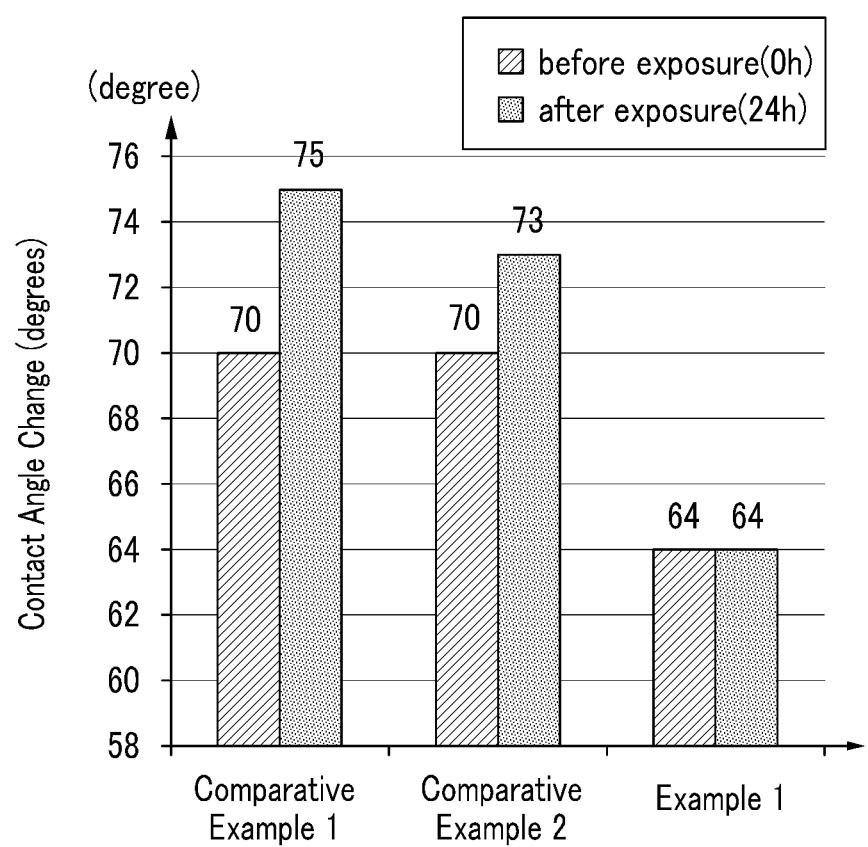
FIG. 12 is a graph contact angle change (degrees) that illustrates environmental stability of the alignment layer in the liquid crystal display for Comparative Examples 1 and 2 and Example 1.

For the liquid crystal display panels of Comparative Examples 1 and 2 and Example 1, results of measuring the environmental stability of the alignment layer are shown in FIG. 12. FIG. 12 is a graph that illustrates environmental stability of the alignment layer in the liquid crystal display. The y axis represents a change in the contact angle, and as the amount of change is decreased, the environmental stability of the alignment layer printing is increased. With reference to FIG. 12, in Example 1, the environmental stability of the alignment layer is higher as compared to Comparative Examples 1 and 2. In addition to the exposure effect to the atmosphere, in terms of the effects of light, the solvent, or the ion in the process, in Example 1, the environmental effect is smaller as compared to Comparative Examples 1 and 2.

Evaluation of the Residual Image

Figure 13:
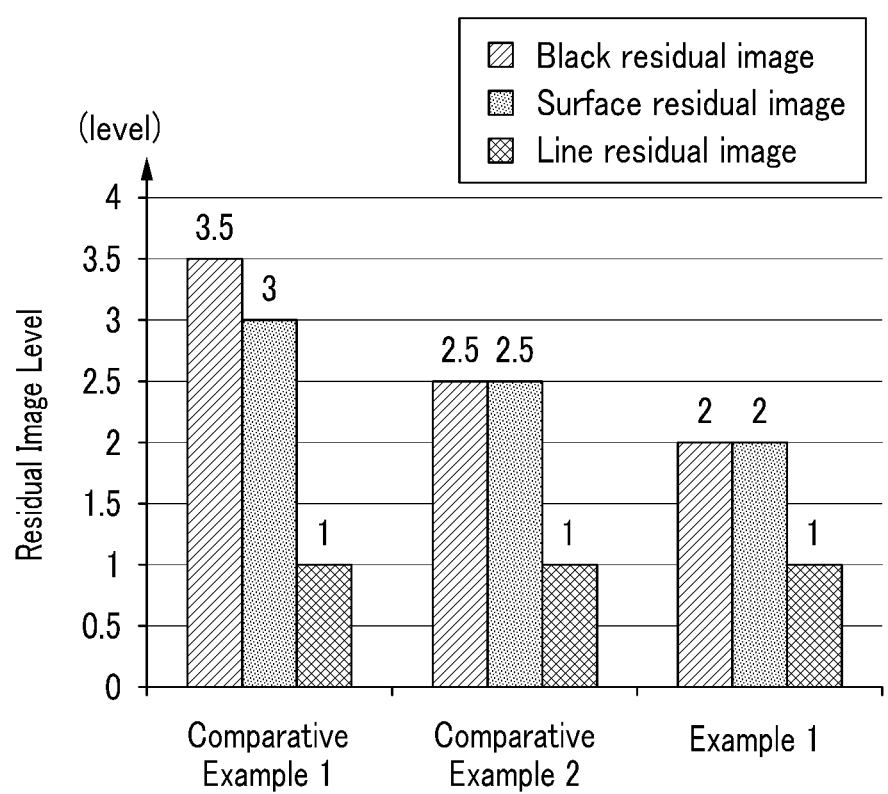
FIG. 13 is a graph of residual image level that illustrates a residual image in the liquid crystal display for Comparative Examples 1 and 2 and Example 1.

For the liquid crystal display panels of Comparative Examples 1 and 2 and Example 1, results of measuring the black residual image, the surface residual image, and the line residual image are shown in FIG. 13. FIG. 13 is a graph that illustrates a residual image in the liquid crystal display. The y axis represents a level of residual image, and as the level of residual image is decreased, a display quality of the liquid crystal display is improved. With reference to FIG. 13, in Example 1, the residual image is smaller as compared to Comparative Examples 1 and 2.

Figure 14:
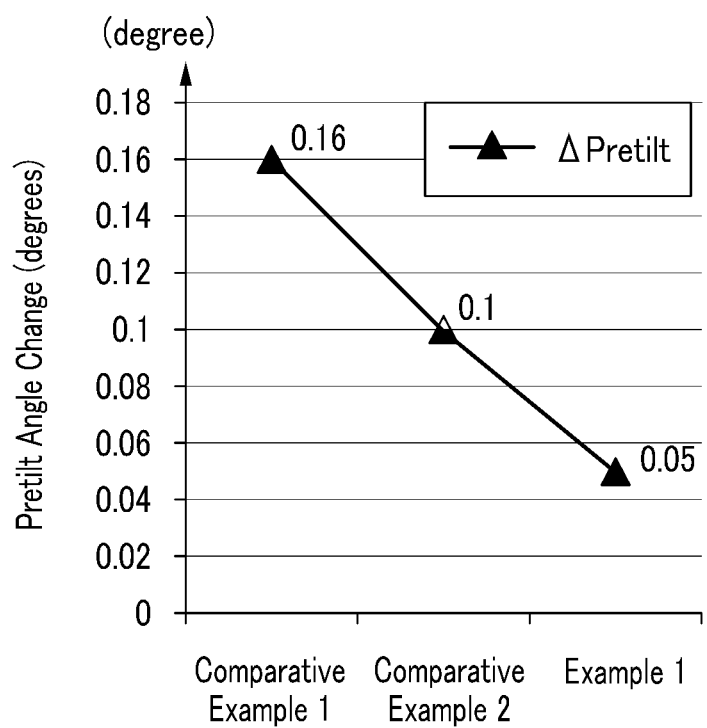
FIG. 14 is a graph of pretilt angle change (degrees) that illustrates a change amount of a pretilt angle in the liquid crystal display for Comparative Examples 1 and 2 and Example 1.

For the liquid crystal display panels of Comparative Examples 1 and 2 and Example 1, results of measuring the change of the pretilt angle are shown in FIG. 14. FIG. 14 is a graph that illustrates a change of a pretilt angle in the liquid crystal display. The y axis represents a change amount of the pretilt angle for 168 hours when the pretilt angle is 50°, and as the change amount is decreased, the display quality of the liquid crystal display is improved. With reference to FIG. 14, in Example 1, the change amount of the pretilt angle is smaller as compared to Comparative Examples 1 and 2.

Evaluation of the Electric Characteristic

Figure 15:
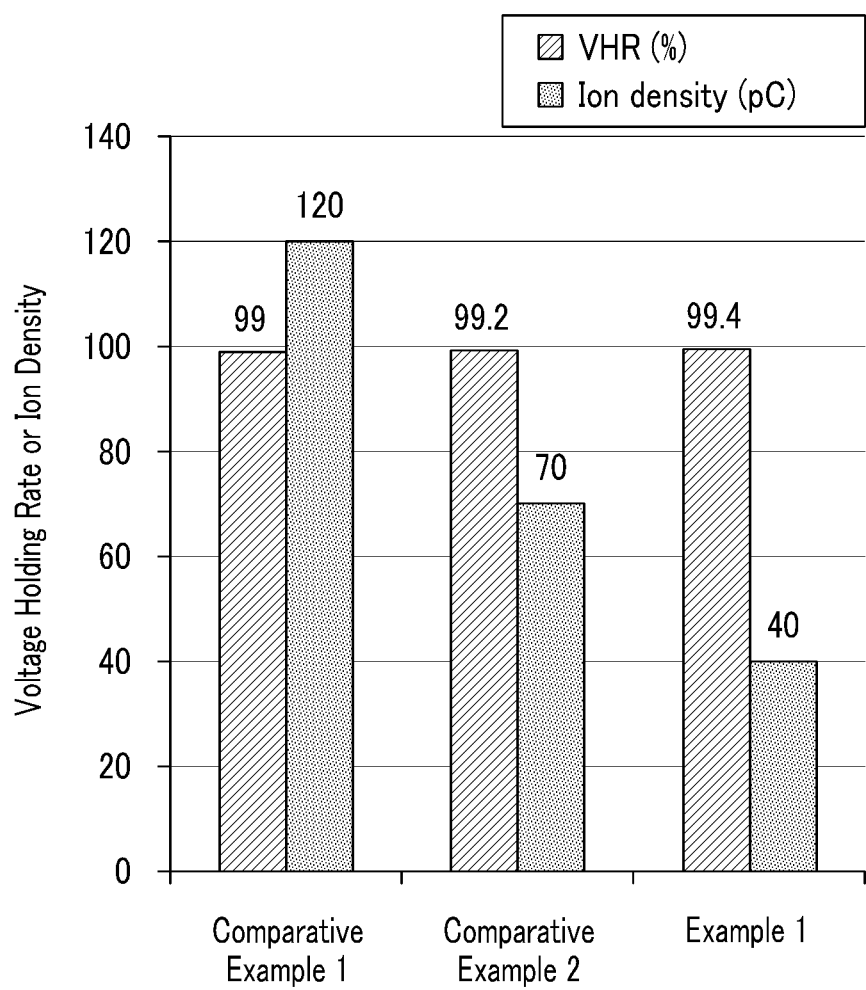
FIG. 15 is a graph of voltage holding rate and ion density that illustrates voltage holding rate ("VHR", %) and ion density (pC) in a liquid crystal display for Comparative Examples 1 and 2 and Example 1.

For the liquid crystal panels of Comparative Examples 1 and 2 and Example 1, results of measuring the voltage holding rate ("VHR") and the ion density are shown in FIG. 15. FIG. 15 is a graph that illustrates VHR and ion density in a liquid crystal display. As the VHR is increased and the ion density is decreased, the electrical characteristics of the liquid crystal display are improved. With reference to FIG. 15, in Example 1, the VHR is larger and the ion density is smaller as compared to Comparative Examples 1 and 2.

According to the exemplary embodiments disclosed herein, it is possible to improve a response speed of a liquid crystal display, and improve stability while generation of a residual image and a stain of the liquid crystal display are decreased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first substrate and a second substrate facing each other,
   a first alignment layer disposed on the first substrate, the first alignment layer consisting of a vertical photo-alignment material;
   a second alignment layer disposed on the second substrate, the second alignment layer consisting of a vertical alignment material; and
   a liquid crystal layer disposed between the first alignment layer and the second alignment layer,
wherein:
   the vertical photo-alignment material comprises a first vertical functional group and a photo-reactive functional group,
   the vertical alignment material comprises a second vertical functional group and does not comprise the photo-reactive functional group,
   wherein the first alignment layer comprises a different material from the second alignment layer,
   wherein the first alignment layer is an irradiated layer and the second alignment layer is a non-irradiated layer,
   wherein the first alignment layer is pretilted, and the second alignment layer is not pretilted,
   wherein the vertical photo-alignment material comprises a polymer formed from a diamine represented by the following Formula 21, a vertical diamine including a cholesteric group, and an acid anhydride represented by the following Formula 11, and

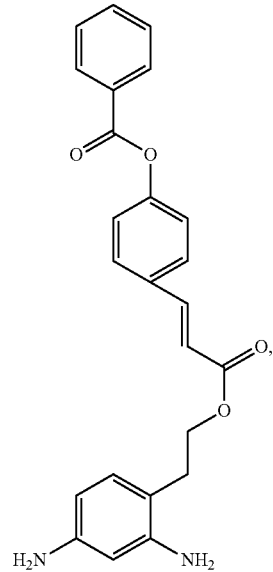

Formula 21

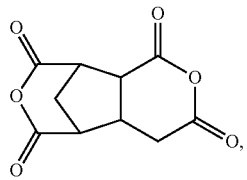

Formula 11 wherein the vertical alignment material comprises a polymerization product of a diamine represented by the following Formula 22 or Formula 23 and an acid anhydride of Formula 11,

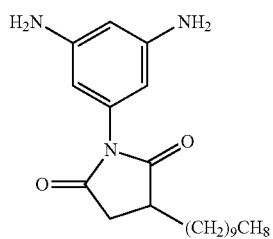

Formula 22

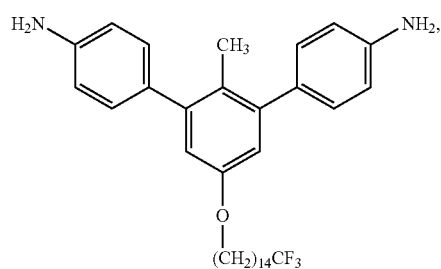

Formula 23 and does not comprise the photo-reactive functional group.

2. The liquid crystal display of claim 1, wherein:
the liquid crystal layer comprises a liquid crystal material, and
further comprises a pixel comprising a plurality of domains in which an alignment direction of a first portion of the liquid crystal material of a first domain is different than an alignment direction of a second portion of the liquid crystal material of a second domain.

3. The liquid crystal display of claim 2, wherein:
the vertical alignment material further comprises a normal diamine group which does not comprise the photo-reactive functional group and the second vertical functional group.

* * * * *